United States Patent Office 3,658,897
Patented Apr. 25, 1972

3,658,897
PROCESS FOR THE PREPARATION OF OPTICALLY ACTIVE LYSINE
Geertrudes H. Suverkropp, Geleen, Netherlands, assignor to Stamicarbon N.V., Heerlen, Netherlands
No Drawing. Filed Mar. 28, 1969, Ser. No. 828,758
Claims priority, application Netherlands, May 31, 1968, 6807773
Int. Cl. C07c *101/24*
U.S. Cl. 260—534 L                     6 Claims

ABSTRACT OF THE DISCLOSURE

There is provided an improvement in the known process of optical resolution of mixtures of L- and D-lysine by reacting the lysine and forming a salt with one of the optical antipodes of α-phenoxy propionic acid. The improvement comprises using optically impure α-phenoxy propionic acid having optical purities of as low as 70%, instead of the more expensive optically pure α-phenoxy propionic acid. The recovery lysine has an optical purity greater than the purity of the α-phenoxy propionic acid used and the recovered α-phenoxy propionic acid can have a purity of essentially 100%.

---

The present invention relates to a process for the preparation of optically active lysine by optical resolution of a mixture of L- and D-lysine. The terms a mixture of L- and D-lysine also include the racemate of lysine and mixtures of the said racemate with the L- and/or D- isomer.

It is known that optical resolutions of this type may be performed (see for example British patent specification 1,075,079 which disclosure is incorporated herein by reference). Generally, the process is carried out by reacting the lysine to be optically resolved with one of the optical antipodes of α-phenoxy propionic acid whereby the corresponding salts are formed. In practice of this known process, the use of the D-α-phenoxy propionic acid antipode gives a solution which is rich in the salt of D-lysine and D-α-phenoxy propionic acid, i.e. the DD-salt, and a solid phase which is rich in the salt of L-lysine and D-α-phenoxy propionic acid, i.e. the LD-salt. On the other hand, the use of the L-α-phenoxy propionic acid antipode gives a solution which is rich in the salt of L-lysine and L-α-phenoxy propionic acid, i.e. the LL-salt and a solid phase which is rich in the salt of D-lysine and L-α-phenoxy propionic acid, i.e. the DL-salt. However, in both cases an essentially pure antipode must be used, as was thought by the art, in order to obtain good optical resolutions and high yields, e.g. optical purities of 99% or greater. Such essentially pure antipodes are, of course, difficult to obtain and are expensive.

Under the circumstances, it is an object of the present invention to provide an improvement of the above noted known process wherein less expensive resolving agents may be used.

Surprisingly, it has now been discovered that the above referenced known process can be carried out by reacting the lysine to be optically resolved with optically impure α-phenoxy propionic acid whereby a solid phase is obtained, from which optically active lysine can be recovered, which recovered lysine has a greater optical purity than the α-phenoxy propionic acid used for effecting the salt formation. Further, it has been surprisingly found that the yield of this improved process is of the same order as obtained in the known process of salt formation with optically pure L- or D-α-phenoxy propionic acid. For example, in the case of salt formation with α-phenoxy propionic acid consisting of 80% of the D-antipode and 20% of the L-antipode, a solid phase is obtained from which L-lysine having an optical purity of 98% can be recovered. This is most surprising and in marked contradistinction to what one skilled in the art would expect, since when using an 80% pure resolving agent of the antipode, one would expect a maximum corresponding optical purity of 80% for the resolved lysine.

It has been further found that in order to obtain an end product with an optical purity which is greater than that of the optically impure α-phenoxy propionic acid used for effecting the salt formation, the optical purity of the optically impure α-phenoxy propionic acid must not be less than 70% pure.

Of course, optical purities of greater than 70% may be used, e.g. purities of 75%, 80% or even 95%. In any event, purities up to the lowest purities used in the known process may be used and still enjoy at least some of the advantage of the present invention, e.g. up to 99% purity. However, purities as low as 70% may be used.

The invention therefore provides an improvement of the known process for the preparation of optically active lysine by optical resolution of a mixture of L- and D-lysine by means of salt formation with essentially pure optically active α-phenoxy propionic acid, wherein the improvement comprises effecting the salt formation with optically impure α-phenoxy propionic acid having an optical purity as low as 70%, and separating off a solid salt in which the lysine contained therein has a greater optical purity than the purity of the said impure α-phenoxy propionic acid used in the salt formation. As a further surprising feature of the invention, the optical purity of the α-phenoxy propionic acid which is recovered from the solid salt is of greater optical purity than that of the α-phenoxy propionic acid used for effecting the salt formation. It has been found that the solid salt from which α-phenoxy propionic acid is recovered can have an optical purity of the acid which is essentially 100%.

The process according to the invention has the distinct advantage in that the expense due to the loss of α-phenoxy propionic acid, which invariably occurs when the optical resolution is effected on an industrial scale, can be offset with the use of the less expensive optically impure α-phenoxy propionic acid as compared with the known process and results in a considerable saving.

The present process may be carried out according to the procedures and conditions of the known process and, therefore, a detailed description of those procedures and conditions is not necessary for purposes of describing the present invention. For example, the salt formation may take place over a wide range of temperatures and pressures, as well as ratios of reactants to diluents and solvents, as is well established with regard to the known process. However, it is preferred that the solid salt to be separated off is obtained by subjecting the mixture of diastereo-isomeric salts obtained in the salt formation to selective countercurrent extraction in the solid state. Better results can be achieved by this procedure in regard to the yield and the optical purity.

Methanol is very suitable and inexpensive for use as extraction solvent in the selective countercurrent extraction process. However, other solvents may be used, such as ethanol, n-propanol and acetone and these in mixture with water.

The temperature at which the selective countercurrent extraction is carried out is not critical and may vary widely, e.g. from 20° C. to 50° C. However, similar to the known process, the present process also yields optimal results when the countercurrent extraction, e.g. with methanol, is performed at about 35° C.

In the present process, the recovery and recirculation of the α-phenoxy propionic acid employed, the recovery of the desired optically active lysine and the racemization of the non-desired optically active lysine followed by recirculation of the resulting racemate can be effected in many various ways, as practiced with the known process. Hence, further elaboration of these procedures is not necessary.

The invention will be elucidated by means of the following examples, which are drawn to the best modes. However, the invention is fully applicable to the extent of the following disclosure. In the examples all ratios and parts are by weight unless otherwise specified.

EXAMPLE I

Portions consisting of 50 g. of dry salt obtained by drying an aqueous solution of equivalent amounts of racemic lysine and α-phenoxy propionic acid consisting of 80% of D-antipode and 20% of L-antipode are each subjected to 3 subsequent extractions.

The first extraction to which each of the portions of 50 g. of dry salt is subjected is carried out with 139 g. of filtrate obtained from a second extraction. Every second extraction is effected with 134 g. of filtrate from a third extraction, while every third extraction is carried out with 130 g. of methanol. The extractions are effected by stirring of the solid substance with the liquid at a temperature of about 35° C. followed by filtration. In a first extraction stirring is continued for 35 minutes, in a second extraction for 20 minutes, and in a third extraction for 11 minutes.

After a third extraction, the residue, consisting of 17.1 g. of solid salt and 5.6 g. of methanol, is dissolved in water. Upon removal of the methanol from the aqueous solution thus obtained, the α-phenoxy propionic acid is released by acidification with hydrochloric acid and subsequently extracted with the aid of toluene. The yield (per portion of 50 g. of dry salt starting product) amounts to 9.1 g. of D-α-phenoxy propionic acid which has an optical purity of essentially 100% (optical purity more than 99.5%) and is dissolved in toluene, and an aqueous solution containing 10 g. of L-lysine monohydrochloride (yield 68.4% calculated to the amount of L-lysine present in the starting product) having a specific rotation $$(\alpha)_D^{20} = +26.0 \ (c.=10; 6 \text{ N HCl})$$

which corresponds to an optical purity of 98%. The L-lysine monohydrochloride obtained is consequently contaminated with 0.2 g. of D-lysine monohydrachloride.

EXAMPLE II

Portions consisting of 50 g. of dry salt obtained by the procedure of Example I, except that the α-phenoxy propionic acid consists of 75% of the D-antipode and 25% of the L-antipode, are each subjected to 3 subsequent extractions. The first extraction to which each of the portions of 50 g. of dry salt is subjected is carried out with 149 g. of filtrate obtained from a second extraction. Every second extraction is effected with 140 g. of filtrate from a third extraction, while every third extraction is carried out with the aid of 130 g. of methanol. The extractions and the working-up of the residue obtained after a third extraction are carried out by the procedure of Example I.

The yield amounts to 8 g. of D-α-phenoxy propionic acid having an optical purity of essentially 100% and 8.8 g. of L-lysine monohydrochloride with an optical purity of 95% (yield 60% calculated on the amount of L-lysine present in the starting product).

EXAMPLE III

Portions consisting of 50 g. of dry salt obtained by the procedure of Example I, except that the α-phenoxy propionic acid consists of 95% of the D-antipode and 5% of the L-antipode, are each subjected to 3 subsequent extractions. The first extraction to which each of the said portions is subjected is carried out with the aid of 138 g. of filtrate obtained in a second extraction. Every second extraction is effected with 134 g. of filtrate from a third extraction, while every third extraction is effected with 130 g. of methanol. The extractions and the working-up of the residue obtained after a third extraction are carried out by the procedure of Example I.

The yield amounts to 10.3 g. of D-α-phenoxy propionic acid having an optical purity of essentially 100% and 11.3 g. of L-lysine monohydrochloride with an optical purity of 99% (yield 77% calculated on the amount of L-lysine present in the starting product).

EXAMPLE IV 50 g. of dry salt are prepared from 23.4 g. of DL-lysine and 26.6 g. of α-phenoxy propionic acid consisting of 80% of the D-antipode and 20% of the L-antipode. The salt is stirred with 50 g. of methanol for 1 hour at 60° C. The resulting mixture is cooled to 35° C. and stirring is continued at this temperature for half an hour. The solid substance which has not yet dissolved is filtered off and stirred with 30 g. of methanol for 20 minutes at 35° C. The solid substance is subsequently filtered off again and stirred with 40 g. of methanol for 20 minutes at 35° C. Finally, the mixture is passed through a filter, the solid matter left on the filter is washed with 10 g. of methanol and dried. 19.6 g. of dry salt are obtained.

The salt is then dissolved in dilute hydrochloric acid and the α-phenoxy propionic acid thus released is extracted with toluene. As a result, an aqueous solution is left which contains 11.5 g. of L-lysine monohydrochloride having an optical purity of 90%. The yield amounts to 87.5% calculated on the amount of L-lysine contained in the starting product.

EXAMPLE V 14.6 g. of DL-lysine, 9.96 g. of D-α-phenoxy propionic acid and 6.64 g. of DL-α-phenoxy propionic acid are dissolved in 18.6 g. of water by heating. After the solution has been allowed to cool down to room temperature, 90 g. of ethanol are, with simultaneous stirring, added dropwise over a period of 1 hour. During this dropwise addition of ethanol the solution is seeded with 0.2 g. of pure LD-salt. After all of the ethanol has been added, stirring is continued for half an hour. The liquid is then passed through a filter, the solid matter left on the filter being washed with 20 g. of ethanol (concentration 96% by weight). Upon drying, 8.3 g. of salt are obtained, which are worked up by the procedure of Example IV.

As a result, an aqueous solution is obtained which contains 4.8 g. of L-lysine monohydrochloride (yield 53% calculated to the amount of L-lysine contained in the starting product) with an optical purity of 94%. The optical purity of the D-α-phenoxy propionic acid obtained in the working-up treatment is essentially 100%.

The so produced lysines may then be used as is well known, e.g. as a nutrient.

What is claimed is:

1. In a process for the preparation of optically active lysine by optical resolution of a mixture of L- and D-lysine wherein a salt is formed by reacting the lysine to be resolved with essentially pure optically active α-phenoxy propionic acid and separating off the so formed salt and recovering the optically active lysine, the improvement comprising effecting the salt formation with optically impure α-phenoxy propionic acid having an optical purity between 70% and 95% and separating off a solid salt in which the lysine contained therein has a greater optical purity than the purity of the said impure α-phenoxy propionic acid used in the salt formation.

2. Process according to claim 1 wherein the mixture of diastereo-isomeric salts obtained in the salt formation step are subjected to selective countercurrent extraction.

3. Process according to claim 2 wherein the solvent used in the selective countercurrent extraction contains methanol.

4. Process according to claim 3 wherein the selective countercurrent extraction is performed at about 35° C.

5. Process according to claim 1 wherein the α-phenoxy propionic acid has an optical purity of between 70% and 90%.

6. Process according to claim 5 wherein the α-phenoxy propionic acid recovered from the process has an optical purity of essentially 100%.

References Cited

UNITED STATES PATENTS 3,431,295  3/1969  Suverkropp et al. ___ 260—534 L

JAMES A. PATTEN, Primary Examiner

J. L. DAVISON, Assistant Examiner

U.S. Cl. X.R.

260—501.11